A. H. MEYER.
TRACTION WHEEL.
APPLICATION FILED MAY 19, 1909.

990,579.

Patented Apr. 25, 1911.

3 SHEETS—SHEET 1.

Witnesses:

Inventor
Adolph H. Meyer
By James L. Norris

A. H. MEYER.
TRACTION WHEEL.
APPLICATION FILED MAY 19, 1909.

990,579.

Patented Apr. 25, 1911.

3 SHEETS—SHEET 2.

Witnesses

Inventor
Adolph H. Meyer
By James L. Norris

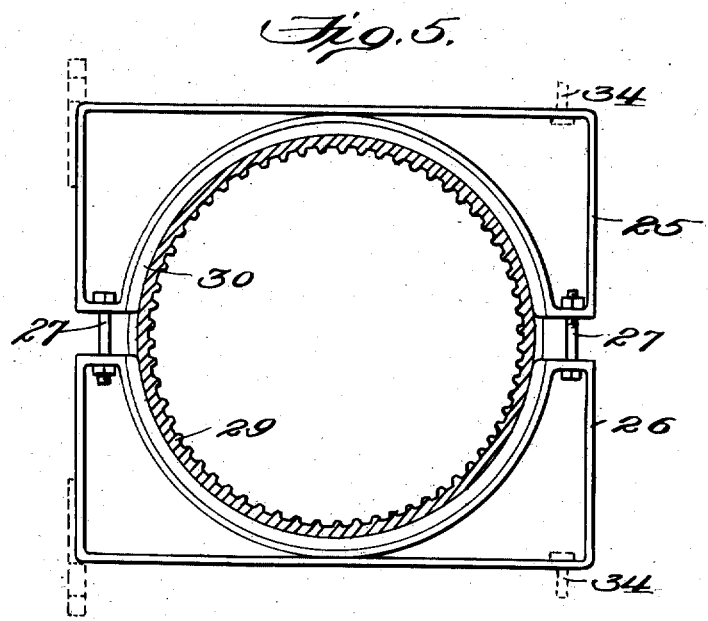
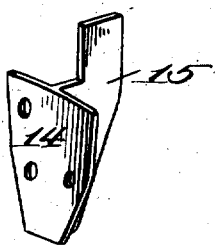

UNITED STATES PATENT OFFICE.

ADOLPH H. MEYER, OF PUKWANA, SOUTH DAKOTA.

TRACTION-WHEEL.

990,579.     Specification of Letters Patent.     Patented Apr. 25, 1911.

Application filed May 19, 1909. Serial No. 497,083.

*To all whom it may concern:*

Be it known that I, ADOLPH H. MEYER, a citizen of the United States, residing at Pukwana, in the county of Brule and State of South Dakota, have invented new and useful Improvements in Traction-Wheels, of which the following is a specification.

My present invention relates to improvements in motor tractors of the type adapted for use in connection with traction engines, plows or agricultural machines of various kinds, and it has for its object primarily to provide an improved traction wheel having traction devices which are arranged at one or both sides of the wheel rim and are adapted to enter the ground when soft and thereby afford the necessary traction, although the weight required to obtain such traction may be relatively light, the traction devices being so mounted in relation to the wheel that an adjustment is provided whereby the traction devices may be held in retracted position automatically as they pass the point of engagement between the ground and the wheel so that in traveling over hard ground or roadways, the machine may move smoothly and easily, the road is not damaged and the traction devices are not injured, such a wheel being capable of use not only as a propelling means for motor driven machines of various kinds, but it may also serve to operate harvesters and similar apparatus as the same are drawn over a field.

Another object of the invention is to provide a mounting for traction wheels of this class whereby the same may be readily applied to traction engines, plows and agricultural apparatus of various kinds, the effective hold upon the ground afforded by the traction wheel enabling it to be used on relatively light apparatus and, moreover, a single wheel may be used which is so mounted that it enables a short turning of the machine or apparatus to be accomplished.

To these and other ends, the invention consists in certain improvements, and combinations and arrangements of parts, all as will be hereinafter more fully described, the novel features being pointed out particularly in the claims at the end of the specification.

Figure 1:
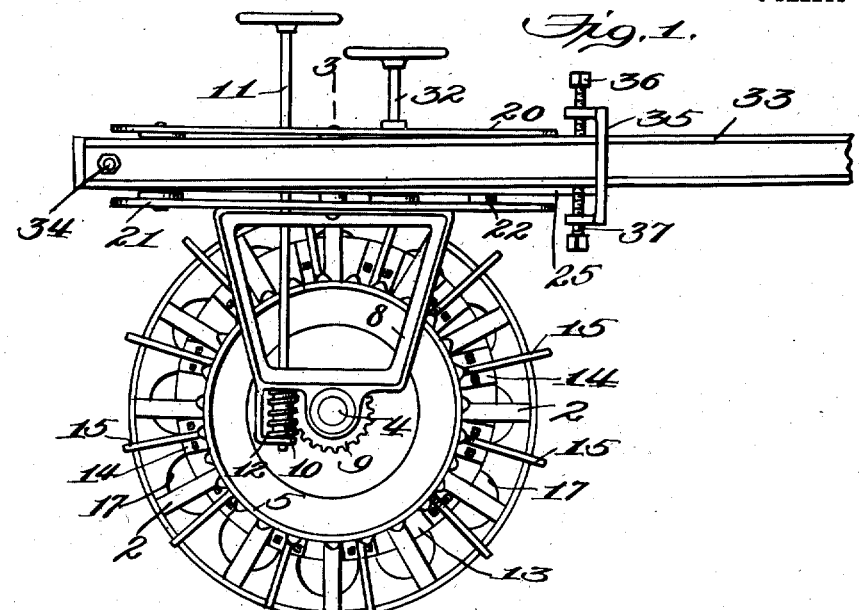
Figure 2:
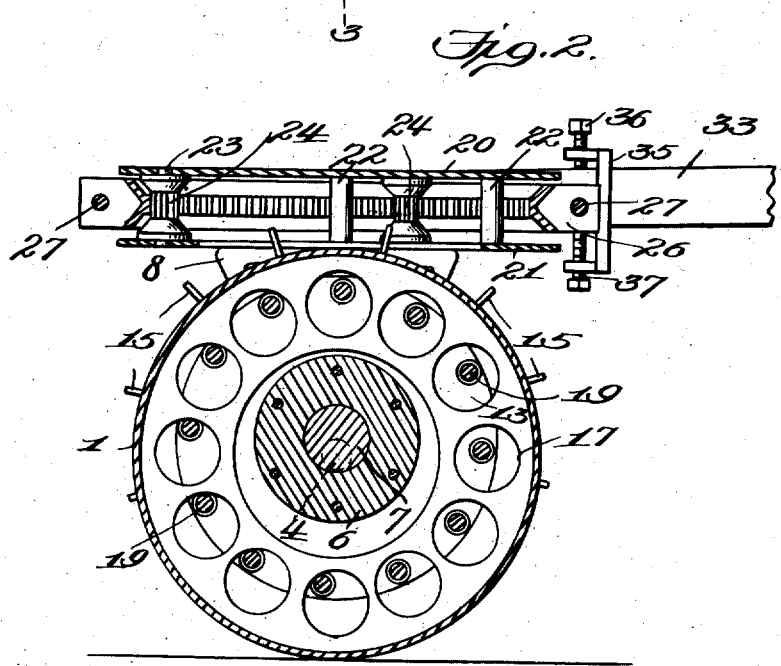
Figure 3:
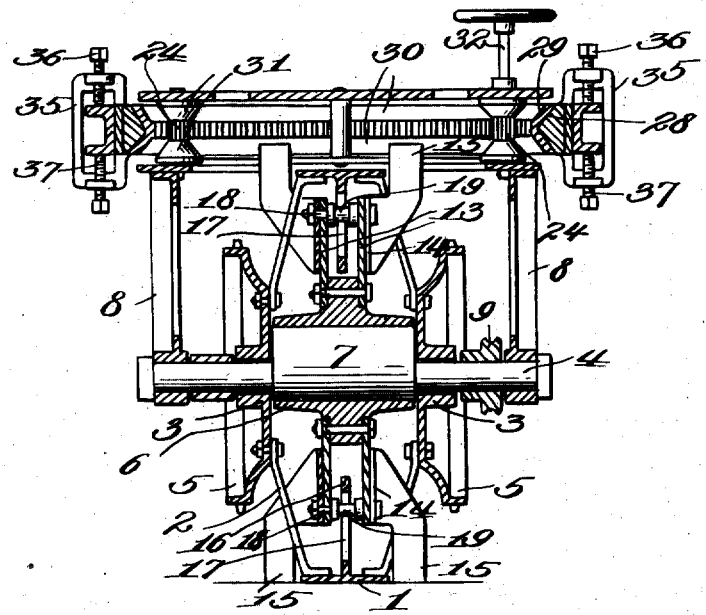
Figure 4:
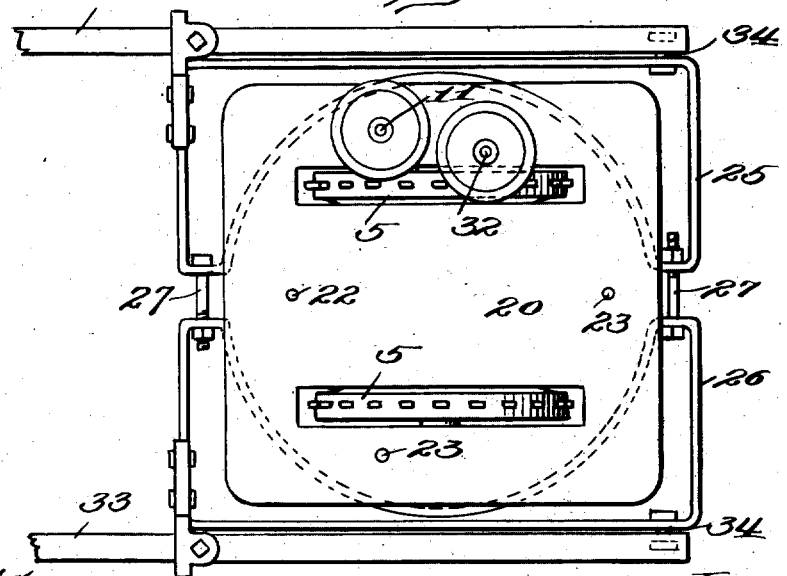

In the accompanying drawing: Figure 1 represents a side elevation of a traction wheel constructed in accordance with my present invention, the same being shown with its mounting whereby it may be attached to the machine to be propelled; Fig. 2 represents a central vertical section of the wheel and its mounting as shown in Fig. 1; Fig. 3 represents a transverse section of the apparatus taken on the line 3—3 of Fig. 1 and looking toward the left; Fig. 4 is a plan view of the apparatus shown in Fig. 1; Fig. 5 is a detail view of the turn-table which carries the traction wheel and the frames which are adapted for attachment to the machine and are supported by the turn-table; and Fig. 6 is a detail perspective view of one of the traction devices removed from the wheel.

Similar parts are designated by the same reference characters in the several views.

In the accompanying drawing, I have shown one embodiment of the invention wherein the wheel is especially adapted for use upon traction engines, plows and agricultural apparatus of various kinds, and in the instance shown, a single wheel is employed and this wheel is provided with an improved mounting whereby a relatively short turning of the machine or apparatus may be accomplished. It will be understood, however, that I have shown but one embodiment of the invention as an example, and that certain modifications and changes may be made therein whereby the invention may be applied to the best advantage in each particular case.

In the present instance the wheel comprises generally two elements which are arranged eccentrically with respect to each other, and one of these elements carries the rim or tire which rolls upon the ground while the other element carries the traction devices, the point of eccentricity of the two elements being variable so that the traction devices may either clear the ground or they may enter the ground during the turning of the wheel.

In the present embodiment of the invention, 1 represents the rim or tire of the wheel which is attached by suitable spokes 2 to a pair of oppositely arranged hubs 3 which are freely revoluble on an axle or shaft 4, it being possible according to the present invention to make the rim smooth on its periphery. In employing the traction wheel as a propelling means for the machine to which it is applied, power is imparted to that element of the wheel which carries the rim and any suitable power transmitting means may be provided for accomplishing this purpose. In the present instance the power is imparted to the two hubs, they being shown in the present instance as having outwardly offset flanges 5 which are toothed to form a pair of sprocket or gear wheels, chains or gears coöperating with these wheels and being driven from any appropriate motor that may be suitably mounted upon the apparatus.

That element of the wheel which carries the traction devices consists in the present instance of a hub 6 which is freely revoluble on an eccentric 7, the latter being fixed to or turnable with the axle 4, the axle 4 being rotatably mounted in suitable bearings formed in the lower ends of a pair of standards 8 which are attached to the lower side of a turn-table that will be hereinafter described, a rotation of the axle 4 serving to vary the eccentricity of the two elements of the wheel and thereby set the traction devices so that they will either engage or clear the ground during the operation of the wheel. Any suitable means may be provided for adjusting the axle to control the operation of the traction devices, a worm-wheel 9 being fixed to this axle for example, and a worm 10 coöperates with the worm-wheel and is carried by an adjusting shaft 11 the lower end of which is journaled in a bracket 12 preferably fixed to the respective standard 8 and this shaft may extend to the top of the turn-table and if desired, it may be provided with a hand-wheel to enable the traction devices to be conveniently adjusted.

The hub 6 which revolves upon the eccentric is provided in the present instance with a pair of opposed annular plates 13, and to these plates are attached the traction devices which in the present instance are arranged at both sides of the wheel rim. Any suitable construction may be adopted for these traction devices, those shown in the present instance consisting of a base plate 14 which is adapted to lie flatwise against its respective supporting plate, and a wing or blade 15 projects outwardly at an angle to this plate and is shaped to clear the wheel rim and to project beyond its periphery at one side of the wheel. These traction devices are rigidly secured to the respective supporting plates in fixed angular relation to one another and when they are used upon both sides of the wheel rim, they are arranged in reverse relation, as shown. By rigidly attaching the set of circumferentially spaced traction devices to these plates, such plates directly transfer the power to the traction devices and there is no sliding engagement between the traction devices and the rim as takes place in those instances where the traction devices are in the form of bars which are pivotally or loosely attached to an inner member, the present construction being not only a simple one, but it possesses the greatest possible strength, and friction and wear are reduced to a minimum.

When the traction devices are in position to engage the ground and thereby increase the traction of the wheel, a driving connection must obviously be employed between that element of the wheel carrying the rim and the element carrying the traction devices. While a driving connection of different forms may be used, I prefer to employ a driving connection similar to that shown in the present instance, it consisting of an inwardly extending flange 16 that is rigidly attached to the wheel rim and is provided with an appropriate number of apertures 17 which are preferably circular and are spaced at suitable intervals, these apertures being preferably concentric with the axle 4. The supporting plates 13 for the traction devices in the present instance are arranged at opposite sides of this inwardly extending flange of the rim, and these plates carry devices which coöperate with the walls of the openings in the said flange and thereby afford the desired driving connection, bolts 18 connecting the plates 13 and extending through the respective openings 17 in the present instance and have preferably anti-friction rollers 19 surrounding them, these rollers being adapted to have a rolling contact with the walls of the openings in the flange. These rollers are preferably flanged or provided with shoulders so as to maintain the inturned flange of the rim in proper spaced relation between the plates 13.

Owing to the eccentricity of that element of the wheel carrying the traction devices, these traction devices will be retracted at one side of the wheel while at the opposite side of the wheel they will project beyond the rim. Obviously, by turning the eccentric the point of eccentricity may be changed so that when the wheel is traveling over hard ground or roadways, the traction devices will be retracted as they pass the point of contact between the ground and the wheel, a smooth running of the machine being thereby accomplished. When, however, the wheel is operating in relatively soft ground, the position of the eccentric may be reversed whereby the traction devices as they pass the point of engagement between the ground and the rim of the wheel will project downwardly beyond the periphery of the rim and will thereby afford the requisite traction. By setting the eccentric at either of these two points just mentioned or at a point intermediate between them, obviously, the traction devices may be either wholly retracted, wholly extended or they may be partially extended according to the nature of the ground over which the wheel is traveling and at all times, a positive and strong driving connection is maintained between the rim of the wheel to which power is applied and the traction devices owing to the engagement of the rollers with the walls of the openings in the flange carried by the wheel rim, friction being minimized by the use of the anti-friction rollers.

In the present instance, I have provided a mounting for the traction wheel whereby it may be so attached to a machine as to enable the same to be readily guided or turned. This turn-table in the present instance consists of a pair of upper and lower sections 20 and 21, the lower one being attached to the wheel supporting standards and these two sections are rigidly united by studs 22 and also by shafts 23 which revolubly support pinions 24. A frame surrounds the turn-table and serves as means for attaching it to the machine or apparatus. In the present instance, a frame is shown which is composed of two sections 25 and 26 the outer sides of which are preferably parallel while their inner sides are segmental or approximately semi-circular, bolts 27 connecting the adjacent ends of the frame sections adjustably. The segmental faces of the frame sections are preferably beveled or inclined reversely as at 28 and an annular rack 29 is adapted to be clamped between the reversely beveled faces of the frame sections by a tightening of the bolts 27. This annular rack has an outer surface to match the reversely inclined faces of the frame sections so that when clamped thereby vertical motion is prevented, and in the present instance, the teeth of the rack are formed in the center or midway of its height, those portions of the rack above and below the rack teeth being beveled as at 30 to form annular upper and lower tracks around which may travel reversely arranged upper and lower conical flanges 31 which are carried by the shafts 23 which support the pinions. These pinions are spaced at appropriate intervals around the turn-table so as to rotatably support the frame thereon, and one of the pinions is provided with a shaft 32 which may be equipped with a hand-wheel whereby the turn-table may be rotated within the frame, the remaining pinions in this instance acting as idlers. Any suitable form of motor and power transmission mechanism may be used, it being possible to use a relatively light motor owing to the efficiency of the traction devices, and this motor may be mounted upon the upper side of the turn-table or the power transmitting mechanism may be mounted upon the upper side of the turn-table and it may be connected by any appropriate gearing to the motor.

Various means may be employed for attaching the wheel to the apparatus to which it is to be applied. In the present instance I have shown a pair of beams 33 which may extend either forwardly or rearwardly from the apparatus, those shown being channel-shaped in cross section with flanges outturned. These beams contain the frame sections between them and in the present instance these frame sections are pivotally attached at one end to the respective beams by means of the pivots 34 while the opposite ends of the frame sections are adjustably connected to the beams by devices which serve to vary the position of the turn-table with respect to these beams whereby the turn-table may be retained in horizontal position although the beams may be inclined. In the present instance I have shown brackets 35 which are attached to the respective frame sections and embrace the beam so as to prevent side motion, a pair of upper and lower set-screws 36 and 37 being fitted in these brackets and arranged to coöperate with the upper and lower sides of the respective channel beams whereby the turn-table may be relatively adjusted about the pivots 34 as centers.

While I have shown the traction wheel in connection with the turn-table in the present instance, it is to be understood that certain features of the invention may be used independently of others. For instance, I have illustrated a construction wherein the traction wheel serves to propel the machine over the ground in which case power is transmitted to the wheel from an appropriate motor. It will be obvious, however, that the traction wheel may be used advantageously as a driving means for operating harvesters and other apparatus as the same is drawn over a field, and while the construction shown in the present instance is the preferable one, it will be understood that it is shown as one embodiment of the invention.

I claim as my invention:

1. A traction device comprising an axle having eccentric and concentric portions, a hub revoluble upon the concentric portion of said axle and adapted to receive driving power, a rim rigidly and concentrically supported with respect to said hub, a second hub revolubly mounted on the eccentric portion of the axle and having a pair of opposed plates rigidly secured thereto and sets of radially extending tractors rigidly secured in fixed angular relation to each plate, the tractors on said plates being offset laterally and adapted to project outwardly beyond the rim and at opposite sides of its marginal edges, and a driving connection between said plates and the rim.

2. A traction device comprising an axle provided with an eccentric portion, a hub revoluble on said eccentric portion and having a pair of opposed circular plates rigidly secured thereto, a pair of hub members revolubly mounted on the axle at opposite sides of said eccentric portion and having means to receive driving power, a rim rigidly connected to said hub members and having an inwardly extending flange which is arranged between the plates on the hub, said flange being formed with a plurality of circular openings, sets of reversely arranged tractors rigidly secured in fixed relation to said plates and offset reversely to project beyond the rim at opposite sides thereof, and devices connecting the plates and extending through the openings in the flange of the rim to coöperate with the walls of said openings and thereby form a driving connection between the rim and tractors irrespective of the eccentric relation of such parts.

3. A traction wheel comprising a rim provided with a flange extending inwardly therefrom and provided with a plurality of annular openings, a hub embodying a pair of opposed members arranged at opposite sides of said flange and carrying tractors, and devices connecting the opposed members of the hub carrying the tractors and coöperative with the walls of the annular openings in the flange of the rim.

4. A traction device comprising an axle, a rim revoluble thereon as an axis and provided with an inwardly extending flange having openings, an eccentric on the axle, a hub revoluble on said eccentric and embodying a pair of opposed plates arranged at opposite sides of said flange, and a plurality of anti-friction devices arranged between said plates and coöperative with the walls of the openings in said flange to form a driving connection between the rim and hub.

5. A traction device comprising a rotatable axle, a rim revoluble thereon, a hub having a set of circumferentially spaced tractors rigidly secured thereto in fixed angular relation and rotatable about an axis eccentric to said axle, and a worm and worm wheel for rotating said axle to vary the point of eccentricity between the rim and hub and to retain the rim and hub in adjusted relation.

6. A traction device comprising an axle, a pair of opposed hubs revoluble thereon, a rim arranged between and connected to said hubs, an eccentric mounted on said axle between the hubs, and a hub revoluble on said eccentric and provided with pairs of rigidly attached reversely arranged traction blades adapted to project beyond the periphery and at opposite sides of said rim.

In testimony whereof I have hereunto set my hand in presence of two subscribing witnesses.

ADOLPH H. MEYER.

Witnesses:
　FRANK A. POWERS,
　LOUIS ANDERS.

---

Copies of this patent may be obtained for five cents each, by addressing the "Commissioner of Patents. Washington, D. C."